(12) United States Patent
Chien

(10) Patent No.: US 11,754,838 B2
(45) Date of Patent: Sep. 12, 2023

(54) NEAR-EYE OPTICAL SYSTEM

(71) Applicant: Coretronic Corporation, Hsin-Chu (TW)

(72) Inventor: Hung-Ta Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 139 days.

(21) Appl. No.: 17/088,586

(22) Filed: Nov. 4, 2020

(65) Prior Publication Data

US 2021/0141228 A1    May 13, 2021

Related U.S. Application Data

(60) Provisional application No. 62/931,813, filed on Nov. 7, 2019.

(30) Foreign Application Priority Data

Jan. 21, 2020   (CN) .......................... 202010070389.2

(51) Int. Cl.
    *G02B 27/01*     (2006.01)
    *G02B 27/28*     (2006.01)
(52) U.S. Cl.
    CPC ....... *G02B 27/0172* (2013.01); *G02B 27/283* (2013.01); *G02B 2027/0123* (2013.01)
(58) Field of Classification Search
    None
    See application file for complete search history.

(56) References Cited

U.S. PATENT DOCUMENTS

| 8,665,178 B1 | 3/2014 | Wang |
| 8,666,208 B1 | 3/2014 | Amirparviz |
| 2006/0132914 A1 | 6/2006 | Weiss et al. |
| 2012/0057253 A1* | 3/2012 | Takagi ............... G02B 27/0172 359/861 |

(Continued)

FOREIGN PATENT DOCUMENTS

| CN | 102385096 | 3/2012 |
| CN | 104216120 | 12/2014 |

(Continued)

OTHER PUBLICATIONS

"Search Report of Europe Counterpart Application", dated Apr. 13, 2021, p. 1-p. 11.

(Continued)

*Primary Examiner* — Nicholas J Lee
(74) *Attorney, Agent, or Firm* — JCIPRNET

(57) ABSTRACT

A near-eye optical system is configured to receive an image beam. The near-eye optical system includes a first optical waveguide, configured to expand the image beam in a first direction, and including a first surface, a second surface, a plurality of first reflecting slopes, and a plurality of second reflecting slopes. The first surface includes a first light-entering area. The second surface is opposite to the first surface. The second surface includes a concave area aligned with the first light-entering area, the concave area including a flat bottom surface, and a first inclined sidewall and a second inclined sidewall opposite to each other. The first reflecting slopes are disposed on the second surface, and the second reflecting slopes are disposed on the second surface.

16 Claims, 5 Drawing Sheets

(56) References Cited

U.S. PATENT DOCUMENTS

2018/0335629 A1* 11/2018 Cheng .................. G06T 19/00

FOREIGN PATENT DOCUMENTS

| CN | 104536138 | 4/2015 |
| CN | 105929545 | 9/2016 |
| CN | 106226902 | 12/2016 |
| CN | 109901259 | 6/2019 |
| CN | 211698438 | 10/2020 |
| JP | 2003029199 | 1/2003 |

OTHER PUBLICATIONS

"Office Action of China Counterpart Application", dated Jun. 6, 2022, p. 1-p. 11.

* cited by examiner

NEAR-EYE OPTICAL SYSTEM

CROSS-REFERENCE TO RELATED APPLICATION

This application claims the priority benefit of U.S. provisional applications Ser. No. 62/931,813, filed on Nov. 7, 2019 and China application serial no. 202010070389.2, filed on Jan. 21, 2020. The entirety of the above-mentioned patent applications is hereby incorporated by reference herein and made a part of this specification.

BACKGROUND OF THE INVENTION

1. Field of the Invention

The invention relates to an optical system, and particularly to a near-eye optical system.

2. Description of Related Art

The history of near-eye optical systems such as Head/Helmet-mounted displays (HMDs) may date back to the 1970s when the U.S. military used a projection apparatus to project images or text information on display components into users' eyes.

In recent years, with the development of micro-display components, i.e., the growing trend of higher resolution, smaller size, and less power consumption, and the development of cloud technologies, i.e., a large amount of information can be downloaded from the cloud anytime and anywhere, the trouble of carrying a huge database around is avoided. The near-eye optical systems have been developed into a portable display device. In addition to the military field, they have also been developed in other related fields such as industrial production, simulation training, 3D display, medical services, sports, and video games to occupy an important position.

If the near-eye optical systems can provide a large field of view, the users can see a larger image with eyes. When an image beam is transmitted using a waveguide, the field of view is mainly affected by materials and a form factor of the waveguide, so the field of view provided by the conventional waveguide is limited and cannot meet requirements.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a near-eye optical system which can effectively expand the range of a field of view and have high optical efficiency and high image uniformity.

A near-eye optical system is configured to receive an image beam. The near-eye optical system includes a first optical waveguide, configured to expand the image beam in a first direction, and including a first surface, a second surface, a plurality of first reflecting slopes, and a plurality of second reflecting slopes. The first surface includes a first light-entering area. The second surface is opposite the first surface. The second surface includes a concave area aligned with the first light-entering area, the concave area including a flat bottom surface, and a first inclined sidewall and a second inclined sidewall opposite each other. The first reflecting slopes are disposed on the second surface, and the second reflecting slopes are disposed on the second surface. The first reflecting slopes, the concave area, and the plurality of second reflecting slopes are sequentially arranged along the first direction, and the first inclined sidewall, the flat bottom surface, and the second inclined sidewall are sequentially arranged along the first direction.

In the near-eye optical system according to embodiments of the invention, the first optical waveguide adopts a concave area including a flat bottom surface, and a first inclined sidewall and a second inclined sidewall opposite each other to divide the image beam into three parts. In this way, the range of a field of view can be expanded in two opposite directions, and the near-eye system has high optical efficiency and high image uniformity.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
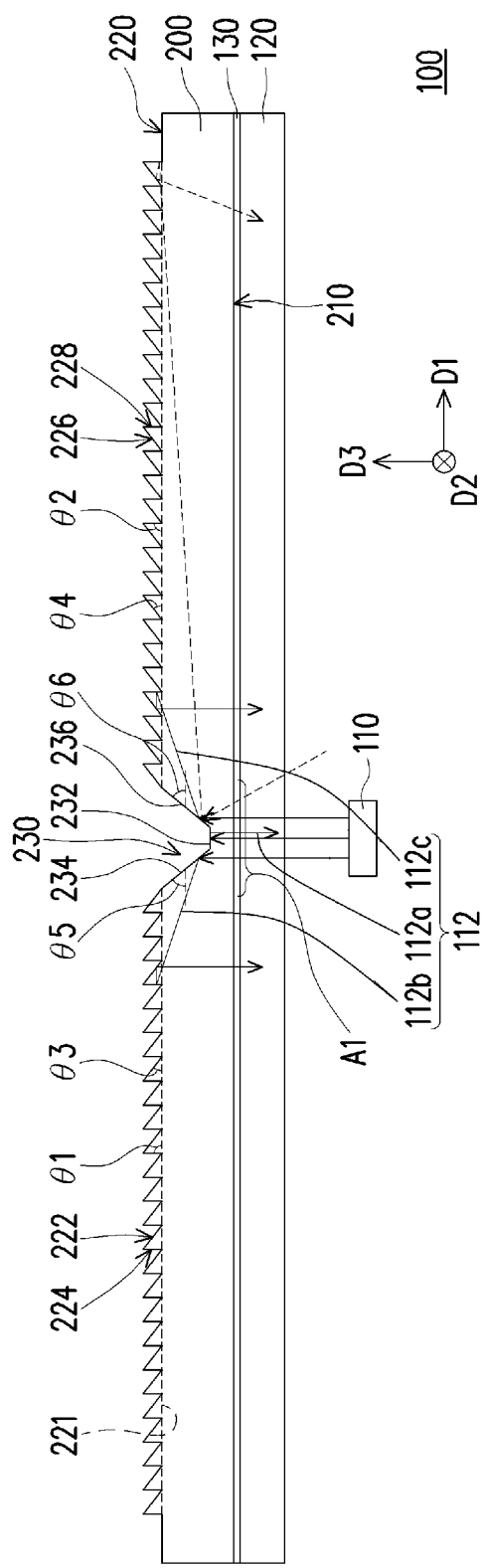
FIG. 1A and FIG. 1B are schematic cross-sectional views of a near-eye optical system in two different directions according to an embodiment of the invention.
Figure 1B:
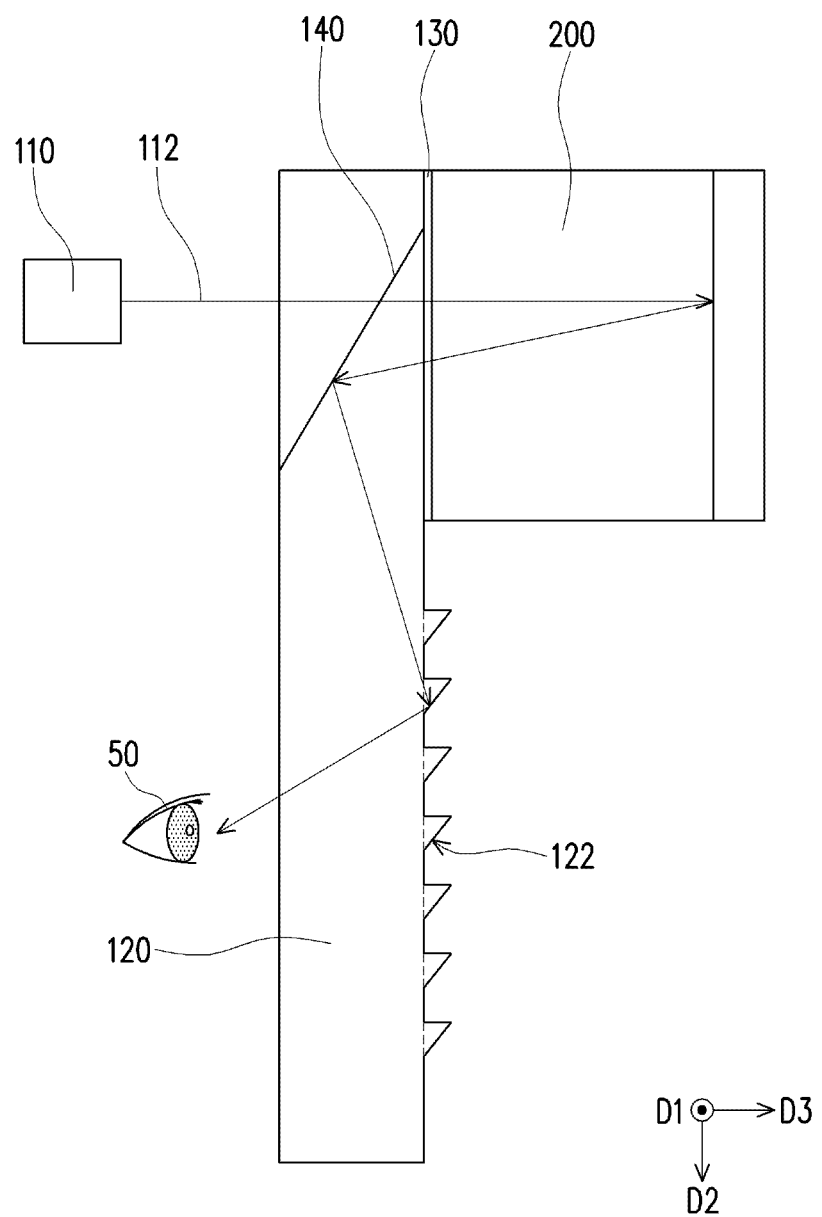

FIG. 1A and FIG. 1B are schematic cross-sectional views of a near-eye optical system in two different directions according to an embodiment of the invention. Referring to FIG. 1A and FIG. 1B, the near-eye optical system 100 in this embodiment is configured to receive an image beam 112 which, for example, is emitted by a projector 110. The projector 110 is, for example, a pico projector. The near-eye optical system 100 includes a first optical waveguide 200, configured to expand the image beam 112 in a first direction D1. The first optical waveguide 200 includes a first surface 210, a second surface 220, a plurality of first reflecting slopes 222, and a plurality of second reflecting slopes 226. The slope is an inclined surface. The first surface 210 includes a first light-entering area A1. The second surface 220 is opposite the first surface 210. The second surface 220 includes a concave area 230 aligned with and corresponding to the first light-entering area A1. The concave area 230 includes a flat bottom surface 232, and a first inclined sidewall 234 and a second inclined sidewall 236 opposite each other. The first reflecting slopes 222 are disposed on the second surface 220, and the second reflecting slopes 226 are disposed on the second surface 220. In the embodiment, the first reflecting slopes 222, the concave area 230, and the second reflecting slopes 226 are sequentially arranged along the first direction D1, and the first inclined sidewall 234, the flat bottom surface 232, and the second inclined sidewall 236 are sequentially arranged along the first direction D1. It should be further noted that along a forward direction and an opposite direction of the first direction D1, the first reflecting slopes 222 and the second reflecting slopes 226 are centered around the concave area 230.

In the embodiment, the first optical waveguide 200 further includes a plurality of first reflecting surfaces 224 and a plurality of second reflecting surfaces 228. The first reflecting surfaces 224 are disposed on the second surface 220, wherein the first reflecting surfaces 224 and the first reflecting slopes 222 are alternately arranged in the first direction D1. The second reflecting surfaces 228 are disposed on the second surface 220, wherein the second reflecting slopes 226 and the second reflecting surfaces 228 are alternately arranged in the first direction D1. In the embodiment, the flat bottom surface 223, the first inclined sidewall 234, the second inclined sidewall 236, the first reflecting slopes 222, the second reflecting slopes 226, the first reflecting surfaces 224, and the second reflecting surfaces 228 are all reflecting planes (reflecting surfaces), which may be coated with a reflecting layer, such as a metal reflecting layer.

In the embodiment, after the image beam 112 enters the first optical waveguide 200 through the first light-entering area A1, the image beam 112 is reflected by the flat bottom surface 232 to form a first part 112a of the image beam 112 and leaves the first optical waveguide 200 through the first surface 210. The image beam 112 is reflected by the first inclined sidewall 234 to form a second part 112b of the image beam 112 which is reflected by the first reflecting surfaces 224 and is reflected by the first reflecting slopes 222 and leaves the first optical waveguide 200 through the first surface 210. The image beam 112 is reflected by the second inclined sidewall 236 to form a third part 112c of the image beam 112 which is reflected by the second reflecting surfaces 228 and is reflected by the second reflecting slopes 226 and leaves the first optical waveguide 200 through the first surface 210.

In the embodiment, the near-eye optical system 100 further includes a second optical waveguide 120, a polarizing beam splitting surface 140, and a quarter waveplate 130. The second optical waveguide 120 is configured to expand the image beam 112 in a second direction D2. In the embodiment, the second direction D2 is perpendicular to the first direction D1. When a user wears the near-eye optical system 100, the first direction D1 is, for example, a horizontal direction, and the second direction D2 is, for example, a vertical direction (gravity direction). However, in other embodiments, it is also possible that the first direction D1 is the vertical direction and the second direction D2 is the horizontal direction. In the embodiment, the first surface 210 is configured between the second optical waveguide 120 and the second surface 220.

Referring to FIG. 1B, the polarizing beam splitting surface 140 is obliquely configured in the second optical waveguide 120, and the quarter waveplate 130 configured between the second optical waveguide 120 and the first surface 210. After the image beam 112 from the projector 110 enters the second optical waveguide 120, it sequentially penetrates the polarizing beam splitting surface 140 and the quarter waveplate 130 to be transmitted to the first light-entering area A1 of the first optical waveguide 200. Next, as described above, after passing through the above path, the first part 112a, the second part 112b, and the third part 112c of the image beam 112 leave the first optical waveguide 200 from the first surface 210. The image beam 112 leaving the first optical waveguide 200 from the first surface 210 sequentially penetrates the quarter waveplate 130, enters the second optical waveguide 120, and is reflected by the polarizing beam splitting surface 140, causing the image beam 112 to be transmitted towards the second direction D2 in the second optical waveguide 120. In the embodiment, the image beam 112 from the projector 110 is, for example, a P-polarizing beam or a non-polarizing beam for the polarizing beam splitting surface 140; therefore, the image beam 112 penetrating the polarizing beam splitting surface 140 is a P-polarizing beam. Then, the image beam 112 enters the first optical waveguide 200 after passing through the quarter waveplate 130, and through reflection and transmittance inside the first optical waveguide 200, the image beam 112 leaving the first optical waveguide 200 from the first surface 210 may be converted to an S-polarizing beam after penetrating the quarter waveplate 130, which may be reflected by the polarizing beam splitting surface 140, causing the image beam 112 to be transmitted towards the second direction D2 in the second optical waveguide 120.

In the embodiment, the second optical waveguide 120 may include a plurality of reflecting slopes 122 arranged in the second direction D2, which may reflect the image beam 112 transmitted in the second optical waveguide 120 to a user's eye 50 to image an image of the image beam 112 on retina of the eye 50 through a light-focusing effect between cornea and lens of the eye 50. That is, the near-eye optical system 100 may form a virtual image in front of the eye 50, and the second optical waveguide 120 is located between the eye 50 and the virtual image. The first direction D1 and the second direction D2 may be perpendicular to a third direction D3 which may be parallel to or approximately parallel to a straight direction of the eye 50. In addition, in the embodiment, the eye 50 not only may see the virtual image displayed by the near-eye optical system 100, but also may see surrounding scenery behind the second optical waveguide 120 through the second optical waveguide 120. That is, an ambient beam passing through the second optical waveguide 120 is accepted by the eye 50, so the near-eye optical system 100 may be used as an augmented reality display.

In the embodiment, inclination angles θ1 and θ2 of the first reflecting surfaces and the plurality of second reflecting surfaces relative to the first surface 210 are all greater than 80 degrees. In addition, in the embodiment, the first inclined sidewall 234 is in mirror symmetry with the second inclined sidewall 236, the first reflecting slopes 222 are in mirror symmetry with the second reflecting slopes 226, and the first reflecting surfaces 224 are in mirror symmetry with the second reflecting surfaces 228. The mirror symmetry takes the concave area 230 as a reference standard.

In the near-eye optical system 100 of the embodiment, its first optical waveguide 200 adopts a concave area 230 including a flat bottom surface 232, and a first inclined sidewall 234 and a second inclined sidewall 236 opposite each other to divide the image beam 112 into three parts. In this way, the range of a field of view can be expanded in two opposite directions (i.e., in the first direction D1 and in the opposite direction of the first direction D1), the near-eye system 100 can improve optical efficiency and image uniformity, and the field of view is increased. In addition, in the near-eye optical system 100 of the embodiment, unlike ordinary waveguides that take advantage of total reflection characteristics of two opposite surfaces, in the embodiment, the image beam 112 directly hits a light extraction structure formed by the first reflecting surfaces 224 and the first reflecting slopes 222 and a light extraction structure formed by the second reflecting surfaces 228 and the second reflecting slopes 226 after being reflected by the first inclined sidewall 234 and the second inclined sidewall 236, and is not propagated by total reflection in the first optical waveguide 200. Therefore, the near-eye optical system of the embodiment can accurately transmit the image beam 112 to the eye 50, and can improve optical efficiency. In addition, since the first optical waveguide 200 does not take advantage of total reflection characteristics of two opposite surfaces like the ordinary waveguides, during design of the light extraction structures, influences of a light extraction structure of the image beam 112 with a small field of view on a light extraction structure of the image beam 112 with a large field of view can be effectively avoided, that is, in the embodiment, light extraction structures with different fields of view may be designed separately, the image beam 112 may be adjusted separately some fields of view, and image uniformity may be improved accordingly. The light extraction structures are, for example, prism column structures.

Besides, in the embodiment, a width of the flat bottom surface 232 in the first direction D1 is less than that in the first direction D1 when the image beam 112 is incident on the concave area 230. In addition, the sum of the inclination angle θ1 of the first reflecting surfaces 224 relative to the first surface 210 (or the inclination angle θ2 of the second reflecting surfaces 228 relative to the first surface 210) plus an inclination angle θ3 of the first reflecting slopes 222 relative to the first surface 210 (or an inclination angle θ4 of the second reflecting slopes 226 relative to the first surface 210) and plus an inclination angle θ5 of the first inclined sidewall 234 relative to the first surface 210 (or an inclination angle θ6 of the second inclined sidewall 236 relative to the first surface 210) is, for example, 180 degrees. Moreover, the first reflecting slopes 222, the second reflecting slopes 226, the first reflecting surfaces 224, and the second reflecting surfaces 228 may be regarded as surfaces of light extraction structures protruding upwards from a datum reference plane 221, wherein the datum reference plane 221 may be parallel to the first surface 210 and the second surface 220, and the flat bottom surface 232 may be parallel to the first surface 210. In the embodiment, two neighbouring light extraction structures are adjacent to each other. However, in other embodiments, a gap may exist between the two neighbouring light extraction structures, and the second surface 220 between two neighbouring light extraction structures connects the two light extraction structures together along the datum reference plane 221.

In addition, in the embodiment, a distance from the first reflecting surface 224 of the light extraction structure farthest from the concave area 230 to the center of the concave area is less than $h/\tan(2*(\theta 5)-90°-\arcsin(\sin(\varphi/n)+w/2)$, where h is a distance from the flat bottom surface 232 to the datum reference plane 221 in the third direction D3 (i.e., in the direction perpendicular to the first surface 210), φ is a maximum output angle in the air before the image beam 112 is incident on the second optical waveguide 120, n is an refractive index of the material of the first optical waveguide 200, and w is a width of the flat bottom surface 232 in the first direction D1. In an embodiment, when it is greater than the above distance, the image beam 112 may not be incident.

Figure 2A:
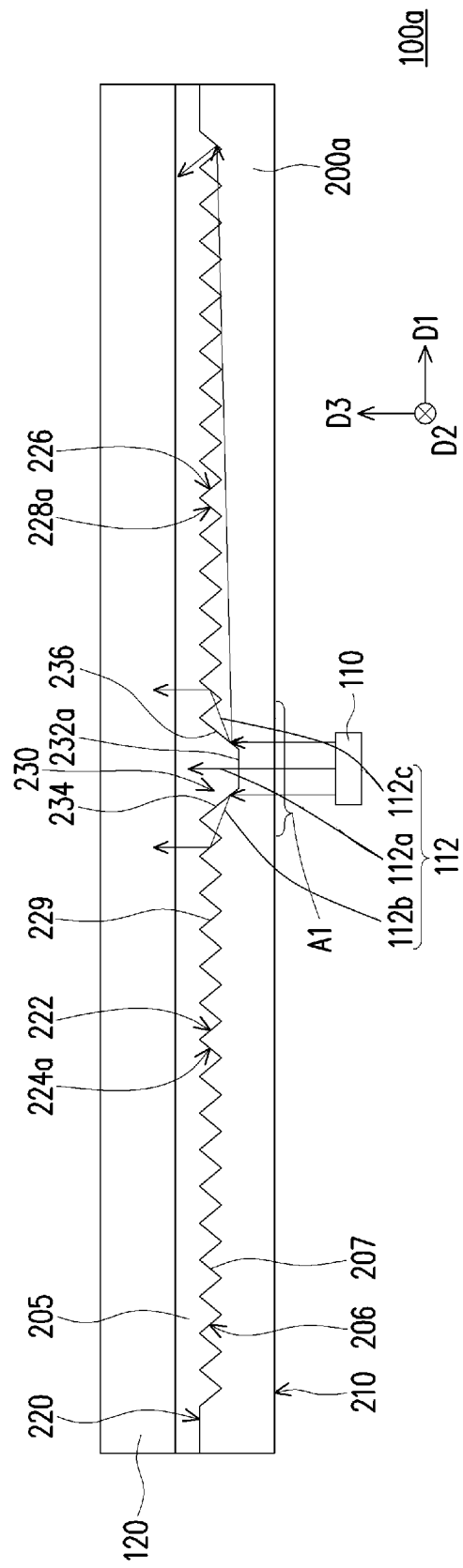
FIG. 2A and FIG. 2B are schematic cross-sectional views of a near-eye optical system in two different directions according to another embodiment of the invention.
Figure 2B:
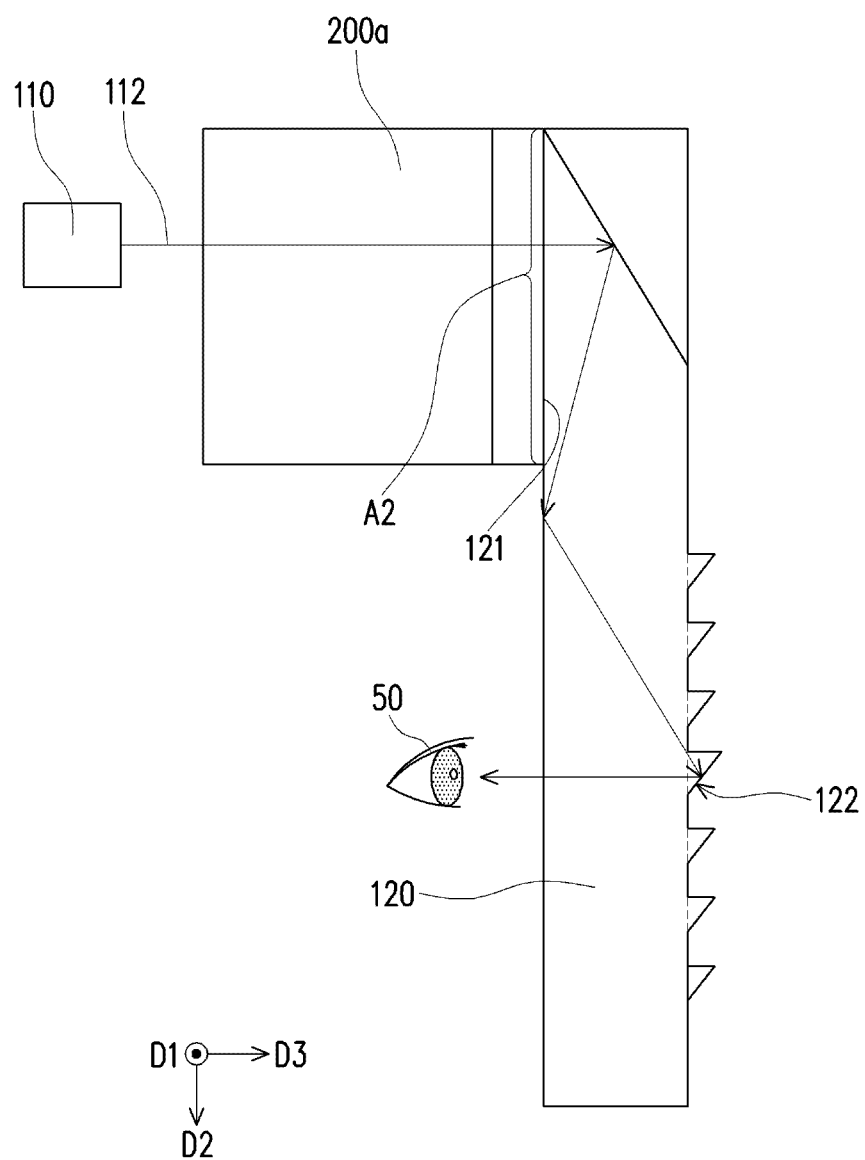

FIG. 2A and FIG. 2B are schematic cross-sectional views of a near-eye optical system in two different directions according to another embodiment of the invention. Referring to FIG. 2A and FIG. 2B, the near-eye optical system 100a of the embodiment is similar to the near-eye optical system 100 in FIG. 1A and FIG. 1B, and their main differences are described as follows. In the near-eye optical system 100a of the embodiment, the flat bottom surface 232a of the concave area 230 of the first optical waveguide 200a is a light transmission surface, and the first inclined sidewall 234, the second inclined sidewall 236, the first reflecting slopes 222, and the second reflecting slopes 236 are all reflecting planes, which may be coated with a reflecting layer, such as a metal reflecting layer.

In the embodiment, the first optical waveguide 200a does not include the first reflecting surfaces 224 and the second reflecting surfaces 228; instead, the first optical waveguide 200a includes a plurality of first transmission surfaces 224a and a plurality of second transmission surfaces 228a. The first transmission surfaces 224a are disposed on the second surface 220, wherein the first reflecting slopes 222 and the first transmission surfaces 224a are alternately arranged in the first direction D1. The second transmission surfaces 228a are disposed on the second surface 220, wherein the second transmission surfaces 228a and the second reflecting slopes 226 are alternately arranged in the first direction D1.

In the present disclosure, after the image beam 112 from the projector 110 enters the first optical waveguide 200a through the first light-entering area A1, the image beam 112 penetrates the flat bottom surface 232a to form a first part 112a of the image beam 112 to leave the first optical waveguide 200a, the image beam 112 is reflected by the first inclined sidewall 234 to form a second part 112b of the image beam 112 which penetrates the plurality of first transmission surfaces 224a and is reflected by the plurality of first reflecting slopes 222 to leave the first optical waveguide 200a, and the image beam 112 is reflected by the second inclined sidewall 236 to form a third part 112c of the image beam 112 which penetrates the plurality of second transmission surfaces 228a and is reflected by the plurality of second reflecting slopes 226 to leave the first optical waveguide 200a.

In the embodiment, the near-eye optical system 100a further includes a compensating waveguide 205 configured on the second surface 220, wherein the first transmission surfaces 224a, the first reflecting slopes 222, the second transmission surfaces 228a, and the second reflecting slopes 226 form a plurality of prism surface structures 229, and a surface 206 of the compensating waveguide 205 facing the first optical waveguide 200a includes a surface structure 207 complementary to the concave area 230 and the prism surface structures 229. In detail, the surface structure 207 of the compensating waveguide 205 is complementary to the surface 206 of the first optical waveguide 200a.

Referring to FIG. 2B, in the embodiment, after leaving the first optical waveguide 200a through the above path, the first part 112a, the second part 112b, and the third part 112c of the image beam 112 are transmitted to a second light-entering area A2 on a surface 121 of the second optical waveguide 120 facing the second surface 220, and enter the second optical waveguide 120 from the second light-entering area A2. For example, after leaving the first optical waveguide 200a, the image beam 112 first penetrates the compensating waveguide 205 and then enters the second optical waveguide 120 from the second light-entering area A2. That is, the second light-entering area A2 is configured to receive the image beam 112 from the second surface 220 of the first optical waveguide 200a.

In the sent embodiment, the first inclined sidewall 234 is in mirror symmetry with the second inclined sidewall 236, the first reflecting slopes 222 are in mirror symmetry with the second reflecting slopes 226, and the first transmission surfaces 224a are in mirror symmetry with the second transmission surfaces 228a. In the embodiment, inclination angles of the first inclined sidewall 234, the second inclined sidewall 236, the first reflecting slopes 222, and the second reflecting slopes 226 relative to the first surface 210 are all equal.

Figure 3:
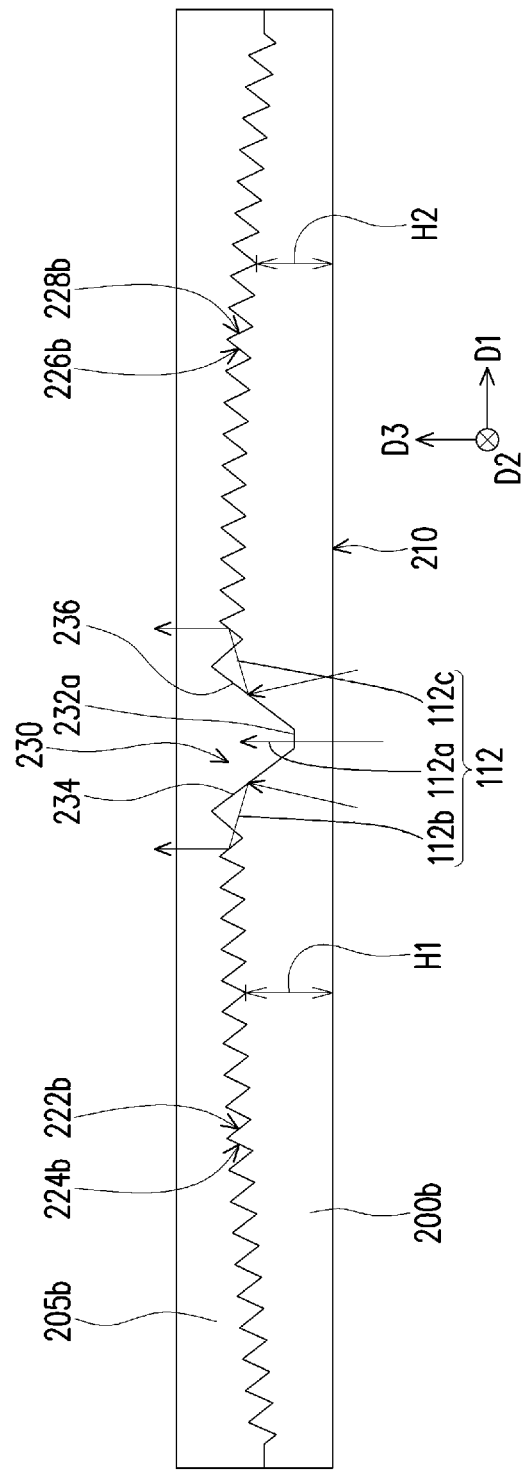
FIG. 3 is a schematic cross-sectional view of a first optical waveguide and a compensating waveguide of a near-eye optical system according to yet another embodiment of the invention.

FIG. 3 is a schematic cross-sectional view of a first optical waveguide and a compensating waveguide of a near-eye optical system according to yet another embodiment of the invention. Referring to FIG. 3, the first optical waveguide 200b and the compensating waveguide 205b in the embodiment are similar to the first optical waveguide 200a and the compensating waveguide 205 in FIG. 2A, and their main differences are described as follows. In the first optical waveguide 200b of the embodiment, a distance H1 between the first reflecting slopes 222b and the first surface 210 increases along the first direction D1, and a distance H2 between the second reflecting slopes 226b and the first surface 210 decreases along the first direction D1. In other words, the closer to the concave area 230, the greater the distances H1 and H2 from the first reflecting slopes 222b and the second reflecting slopes 226b to the first surface 210, and the farther away from the concave area 230, the smaller the distances. In this way, the first reflecting slopes 222b and the second reflecting slopes 226b far away from the concave area 230 can also receive the image beam 112 with enough light intensity, so brightness uniformity of the image may be effectively maintained. In addition, in the embodiment, the first reflecting surface 224b is configured between two neighbouring first reflecting slopes 222b, and the second reflecting surface 228b is configured between two neighbouring second reflecting slopes 226b. The distances H1 and H2 from the first reflecting slopes 222b and the second reflecting slopes 226b to the first surface 210 are values calculated based on average values.

Based on the above, in the near-eye optical system according to the embodiments of the invention, its first optical waveguide adopts a concave area including a flat bottom surface, and a first inclined sidewall and a second inclined sidewall opposite each other to divide the image beam into three parts. In this way, the range of a field of view can be expanded in two opposite directions, and the near-eye system has high optical efficiency and high image uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A near-eye optical system, configured to receive an image beam, wherein the near-eye optical system comprises:
  a first optical waveguide, configured to expand the image beam in a first direction, and comprising:
    a first surface having a first light-entering area;

a second surface opposite to the first surface, the second surface having a concave area aligned with the first light-entering area, and the concave area having a flat bottom surface, and a first inclined sidewall and a second inclined sidewall opposite to each other;

a plurality of first reflecting slopes disposed on the second surface; and a plurality of second reflecting slopes disposed on the second surface, wherein the plurality of first reflecting slopes, the concave area, and the plurality of second reflecting slopes are sequentially arranged along the first direction, the first inclined sidewall, the flat bottom surface, and the second inclined sidewall are sequentially arranged along the first direction, wherein the flat bottom surface is parallel to the first surface, and the image beam is guided to leave the first optical waveguide by the flat bottom surface.

2. The near-eye optical system according to claim 1, wherein the flat bottom surface, the first inclined sidewall, the second inclined sidewall, the plurality of first reflecting slopes and the plurality of second reflecting slopes are all reflecting planes.

3. The near-eye optical system according to claim 2, wherein the first optical waveguide further comprises:

a plurality of first reflecting surfaces disposed on the second surface, wherein the plurality of first reflecting surfaces and the plurality of first reflecting slopes are alternately arranged in the first direction; and a plurality of second reflecting surfaces disposed on the second surface, wherein the plurality of second reflecting slopes and the plurality of second reflecting surfaces are alternately arranged in the first direction.

4. The near-eye optical system according to claim 3, wherein after the image beam enters the first optical waveguide through the first light-entering area, the image beam is reflected by the flat bottom surface to form a first part of the image beam and leaves the first optical waveguide through the first surface, the image beam is reflected by the first inclined sidewall to form a second part of the image beam which is reflected by the plurality of first reflecting surfaces and is reflected by the plurality of first reflecting slopes and leaves the first optical waveguide through the first surface, and the image beam is reflected by the second inclined sidewall to form a third part of the image beam which is reflected by the plurality of second reflecting surfaces and is reflected by the plurality of second reflecting slopes and leaves the first optical waveguide through the first surface.

5. The near-eye optical system according to claim 4, further comprising:

a second optical waveguide, configured to expand the image beam in a second direction, wherein the first surface is disposed between the second optical waveguide and the second surface;

a polarizing beam splitting surface obliquely configured in the second optical waveguide; and a quarter waveplate disposed between the second optical waveguide and the first surface, wherein after entering the second optical waveguide, the image beam sequentially penetrates the polarizing beam splitting surface and the quarter waveplate to be transmitted to the first light-entering area of the first optical waveguide, and the image beam leaving the first optical waveguide from the first surface sequentially penetrates the quarter waveplate, enters the second optical waveguide, and is reflected by the polarizing beam splitting surface, causing the image beam to be transmitted towards the second direction in the second optical waveguide.

6. The near-eye optical system according to claim 3, wherein inclination angles of the plurality of first reflecting surfaces and the plurality of second reflecting surfaces relative to the first surface are greater than 80 degrees.

7. The near-eye optical system according to claim 3, wherein the first inclined sidewall is in mirror symmetry with the second inclined sidewall, the plurality of first reflecting slopes are in mirror symmetry with the plurality of second reflecting slopes, and the plurality of first reflecting surfaces are in mirror symmetry with the plurality of second reflecting surfaces.

8. The near-eye optical system according to claim 1, wherein the flat bottom surface is a light transmission surface, and the first inclined sidewall, the second inclined sidewall, the plurality of first reflecting slopes, and the plurality of second reflecting slopes are all reflecting planes.

9. The near-eye optical system according to claim 8, wherein the first optical waveguide further comprises:

a plurality of first transmission surfaces disposed on the second surface, wherein the plurality of first reflecting slopes and the plurality of first transmission surfaces are alternately arranged in the first direction; and a plurality of second transmission surfaces disposed on the second surface, wherein the plurality of second transmission surfaces and the plurality of second reflecting slopes are alternately arranged in the first direction.

10. The near-eye optical system according to claim 9, wherein after the image beam enters the first optical waveguide through the first light-entering area, the image beam penetrates the flat bottom surface to form a first part of the image beam to leave the first optical waveguide, the image beam is reflected by the first inclined sidewall to form a second part of the image beam which penetrates the plurality of first transmission surfaces and is reflected by the plurality of first reflecting slopes to leave the first optical waveguide, and the image beam is reflected by the second inclined sidewall to form a third part of the image beam which penetrates the plurality of second transmission surfaces and is reflected by the plurality of second reflecting slopes to leave the first optical waveguide.

11. The near-eye optical system according to claim 10, further comprising:

a second optical waveguide, configured to expand the image beam in a second direction, the second optical waveguide having a second light-entering area on a surface facing the second surface, and the second light-entering area being configured to receive the image beam from the second surface.

12. The near-eye optical system according to claim 9, further comprising a compensating waveguide configured on the second surface, wherein the plurality of first transmission surfaces, the plurality of first reflecting slopes, the plurality of second transmission surfaces, and the plurality of second reflecting slopes form a plurality of prism surface structures, and a surface of the compensating waveguide facing the first optical waveguide has a surface structure complementary to the concave area and the plurality of prism surface structures.

13. The near-eye optical system according to claim 9, wherein the first inclined sidewall is in mirror symmetry with the second inclined sidewall, the plurality of first reflecting slopes are in mirror symmetry with the plurality of second reflecting slopes, and the plurality of first transmission surfaces are in mirror symmetry with the plurality of second transmission surfaces.

14. The near-eye optical system according to claim 8, wherein a distance between the plurality of first reflecting slopes and the first surface gradually increases along the first direction, and a distance between the plurality of second reflecting slopes and the first surface gradually decreases along the first direction.

15. The near-eye optical system according to claim 8, wherein inclination angles of the first inclined sidewall, the second inclined sidewall, the plurality of first reflecting slopes, and the plurality of second reflecting slopes relative to the first surface are all equal.

16. The near-eye optical system according to claim 1, wherein the first inclined sidewall is in mirror symmetry with the second inclined sidewall, and the plurality of first reflecting slopes are in mirror symmetry with the plurality of second reflecting slopes.

* * * * *